Patented July 6, 1937

2,086,146

UNITED STATES PATENT OFFICE 2,086,146

NITRATED HYDROXY ESTERS OF PENTAERYTHRITOL

Joseph A. Wyler, Allentown, Pa., assignor to Trojan Powder Company, a corporation of New York No Drawing. Application February 2, 1935,
Serial No. 4,650

4 Claims. (Cl. 260—106)

My invention relates to the preparation and use of novel compounds obtained by the nitration of hydroxy acid esters of pentaerythritol, and has as its principal object the preparation of new bodies useful not only in the manufacture of propellent and brisant explosives, but also useful in the preparation of lacquers and plastics of wide variety.

I have discovered that pentaerythritol will react with lactic acid to form a lactic acid ester of pentaerythritol, the composition of the ester depending upon the proportions of pentaerythritol to acid, as well as upon the temperature and concentration of the reagents, and the time permitted in the reaction step.

As one example, 136 parts of pentaerythritol are mixed with 180 parts of lactic acid of 50% strength and 5 parts of a concentrated aqueous hydrochloric acid and the mixture may be heated to as high as 150° C. and kept at this temperature for as much as twenty-four hours. The preferred temperature is between 100° C. and 120° C., and the preferred period of reaction is six hours. The resulting product is a soft solid at ordinary temperatures, and consists mainly of the mono- and dilactates of pentaerythritol. Catalysts, such as aluminum sulfate for example, may be employed to assist the reaction.

If instead of the proportions used above, 136 parts of pentaerythritol are mixed with 360 parts of lactic acid of 50% strength and 5 parts of concentrated aqueous hydrochloric acid and this mixture heated to as high as 150° C. for twenty-four hours, a very viscous liquid consisting essentially of pentaerythritol dilactate and trilactate is obtained.

The tetralactate of pentaerythritol may be obtained by heating together pentaerythritol and lactic acid and a catalyst such as concentrated hydrochloric acid for as much as twenty-four hours at a temperature as high as 150° C., the lactic acid being present in some excess over that theoretically required to give the tetralactate.

It will of course be understood that by causing pentaerythritol and lactic acid to react in the manner described, the products obtained will in general be mixtures of two or more lactates. But this is not a real disadvantage in connection with the use of the products either in explosives or for other purposes.

The reaction which occurs when lactic acid and pentaerythritol unite to form pentaerythritol tetralactate is expressed by the following equation:

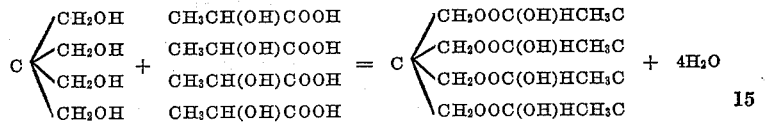

and it will be noted that there are just as many hydroxyl groups present in the final product as were originally present in the pentaerythritol.

Although I prefer to prepare hydroxy esters of pentaerythritol by the method above described, I do not wish to limit myself to this method of preparation, as suitable hydroxy esters for the practice of my invention may be prepared by the distillation of a mixture of pentaerythritol and lactic acid with toluene, carbon tetrachloride, xylene, heptane, or tertiary alcohols or the like, and suitable esters may also be obtained by the addition of lactyl chloride in solution in pyridine to a vigorously stirred mixture of pentaerythritol and pyridine, this latter method being preferred when it is desired to obtain the lactic acid derivatives in very pure condition.

Although my invention is particularly applicable to the preparation of the nitric acid esters of the lactic acid esters of pentaerythritol, I wish to particularly point out that my invention is not limited to the use of the lactic acid esters, as I may use with equal success other hydroxy acids, such as glycollic acid, hydroxybutyric acid, tartaric acid, and the like to form hydroxy esters of pentaerythritol, employing in all cases methods of esterification well known in the art.

The hydroxy acid esters of pentaerythritol may be conveniently nitrated by the use of the well known nitration methods. As an example, I may dissolve 100 parts of the trilactic ester of pentaerythritol in 400 parts of 98% nitric acid in the cold and then add 510 parts of 105% oleum slowly, with cooling and stirring. The nitrated ester separates as a liquid floating on the surface of the spent acid. This liquor may be separated, washed and neutralized by the methods commonly employed in the treatment of nitroglycerin in its commercial manufacture.

Instead of dissolving the hydroxy-ester of pentaerythritol in nitric acid and then adding sulfuric acid or oleum, I may nitrate directly in nitrating acid composed of a suitable mixture of nitric acid and sulfuric acid. Nitrating acid containing 40% of nitric acid and 60% of sulfuric acid is suitable for the nitration of these hydroxy esters of pentaerythritol, and their nitration is so readily performed that considerable latitude is permissible in the choice of nitrating conditions, including the strength of the nitrating acid and the time and temperature conditions permitted during the nitration step.

In the nitration of the hydroxy esters to form the products represented by my invention, the nitrate group replaces the hydroxyl group of the acid residue as well as any non-substituted hydroxyl group of the pentaerythritol itself.

For example, in the nitration of erythritol glycollate to erythritol glycollate tetranitrate the following reaction occurs:

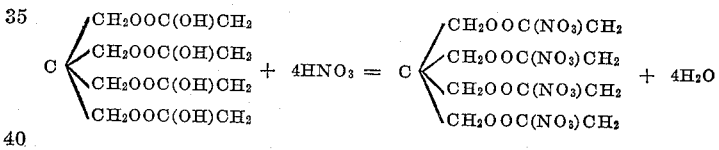

These nitrated erythritol hydroxy esters are new bodies, and what I desire to protect by Letters Patent is not only these substances themselves and the process of making them, but also compositions of matter comprising them.

I have discovered that the nitrated lactic esters of pentaerythritol and the nitrated glycollic esters of pentaerythritol, either alone or admixed with pentaerythritol tetranitrate, may be used as explosives of exceptional strength, and of very great stability. I have found that the lactic acid esters and the glycollic acid esters of pentaerythritol may not only be employed as explosives themselves, but may be advantageously admixed with other oxidizing agents such as ammonium nitrate, any of the alkali earth metal nitrates or alkali nitrates, or any of the corresponding chlorates, perchlorates, etc. and with organic nitro or nitrate compounds, such as nitroglycerin, nitroglycol, tetranitromethane, nitrated carbohydrates, trinitrotoluol, pentaerythritol tetranitrate, nitrostarch, etc.

I have also discovered that these nitrated hydroxy acid esters of pentaerythritol have a solvent and plasticizing effect upon nitrostarch and nitrocellulose, thus producing compositions of matter of usefulness in the lacquer and artificial leather trades as well as in the propellent explosives industry. These nitrated hydroxy acid esters have a particularly favorable effect upon nitrostarch in that they produce films from it which are of excellent hardness and which have vastly improved non-cracking and adhering properties.

It is well known that the lactic acid esters of glycol, glycerin and of other structurally similar polyhydric alcohols have been nitrated but the products resulting from these lactic acid esters are relatively thin liquids of practically no usefulness from the standpoint of military explosives. These particular nitrated lactic acid derivatives have a chemical structure which is fundamentally weak, as compared to that of the nitrated lactic acid and glycollic acid derivatives of pentaerythritol and consequently the stabilities of the former are not as good as the stabilities of the pentaerythritol derivatives.

The basic structures of the compounds which are the subject of the present invention are as follows:

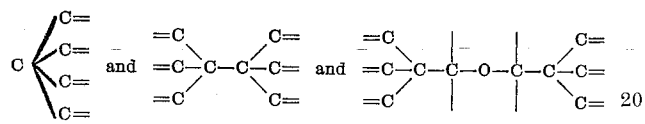

and it will be apparent that we may have as high as six nitrate groups in the case of dipentaerythritol derivatives.

Although I have referred in this application to the lactic, glycollic, hydroxy butyric and tartaric esters of pentaerythritol, I wish to point out that my invention also covers equally the very closely related dipentaerythritol compounds, and I have discovered that both in preparation and in properties the nitrated hydroxy acid esters of the dipentaerythritols are the full equivalents of the nitrated hydroxy acid esters of pentaerythritol, and accordingly my invention covers both the nitrated hydroxy esters of pentaerythritol and the nitrated hydroxy esters of the dipentaerythritols, of which there appear to be two types, slightly different in structure, one representing a simple linking of two pentaerythritol groups, while the other represents an ether of pentaerythritol.

In the compositions of matter comprising these new nitrated hydroxy esters of erythritol I do not confine myself to any particular method of making these compositions as, for instance, I may use pentaerythritol tetranitrate dissolved in a liquid nitrated hydroxy acid ester of pentaerythritol or I may use the pentaerythritol tetranitrate simply mixed with the nitrated hydroxy acid ester of pentaerythritol, or I may co-nitrate pentaerythritol and the hydroxy acid ester of the pentaerythritol, thus obtaining a nitrated product in a pulverulent condition, which condition is particularly favorable for the stabilization of the nitrated product.

It will be evident that many modifications may be made without departing from the principles of the disclosure as herein made, and accordingly no limitations should be made upon my invention, except such as are indicated in the appended claims.

I claim:
1. The compounds formed by nitrating the reaction products of a member of the group pentaerythritol and dipentaerythritol with a hydroxy aliphatic carboxylic acid containing not more than two hydroxyl groups.

2. The compounds formed by nitrating the reaction products of a member of the group pentaerythritol and dipentaerythritol with a member of the group lactic acid, glycollic acid, hydroxy butyric acid, tartaric acid.

3. The process which comprises nitrating a pentaerythritol lactate.

4. The process which comprises nitrating the compounds formed as reaction products of a member of the group pentaerythritol and dipentaerythritol with a hydroxy aliphatic carboxylic acid containing not more than two hydroxyl groups.

JOSEPH A. WYLER.